United States Patent [19]

Adams

[11] 4,263,816
[45] Apr. 28, 1981

[54] STEERING GEAR ASSEMBLIES

[75] Inventor: Frederick J. Adams, Clevedon, England

[73] Assignee: Cam Gears Limited, Hertfordshire, England

[21] Appl. No.: 869,955

[22] Filed: Jan. 16, 1978

[51] Int. Cl.³ .............................................. F16H 57/00
[52] U.S. Cl. .......................................... 74/411; 74/422
[58] Field of Search ......................... 74/498, 422, 411

[56] References Cited

U.S. PATENT DOCUMENTS

| 3,630,099 | 12/1971 | Miyoshi | 74/498 |
| 3,844,182 | 10/1974 | Bradshaw et al. | 74/498 |
| 3,897,845 | 8/1975 | Von Löwis | 74/498 X |
| 3,944,015 | 3/1976 | Bishop | 74/498 X |
| 3,979,968 | 9/1976 | Ceccherini | 74/498 |
| 3,995,511 | 12/1976 | Bishop | 74/498 |

FOREIGN PATENT DOCUMENTS

| 2223527 | 5/1972 | Fed. Rep. of Germany . |
| 609356 | 3/1947 | United Kingdom . |
| 1000594 | 8/1955 | United Kingdom . |
| 910751 | 12/1958 | United Kingdom . |
| 1182903 | 10/1968 | United Kingdom . |

Primary Examiner—William E. Wayner
Attorney, Agent, or Firm—Yount & Tarolli

[57] ABSTRACT

A rack and pinion steering gear assembly comprising an output member to effect steering, a manually rotatable input shaft and a variable ratio steering mechanism interposed between the input shaft and the output member with the steering mechanism comprising a rack connected to the output member, a pinion meshing with the rack connected to the input shaft and rotatable to cause longitudinal movement of the rack. The pinion is slidable axially along its axis of rotation upon the application of torque thereto and biasing means controls the axial displacement to thereby vary the effective mechanical ratio between the rack and pinion.

5 Claims, 1 Drawing Figure

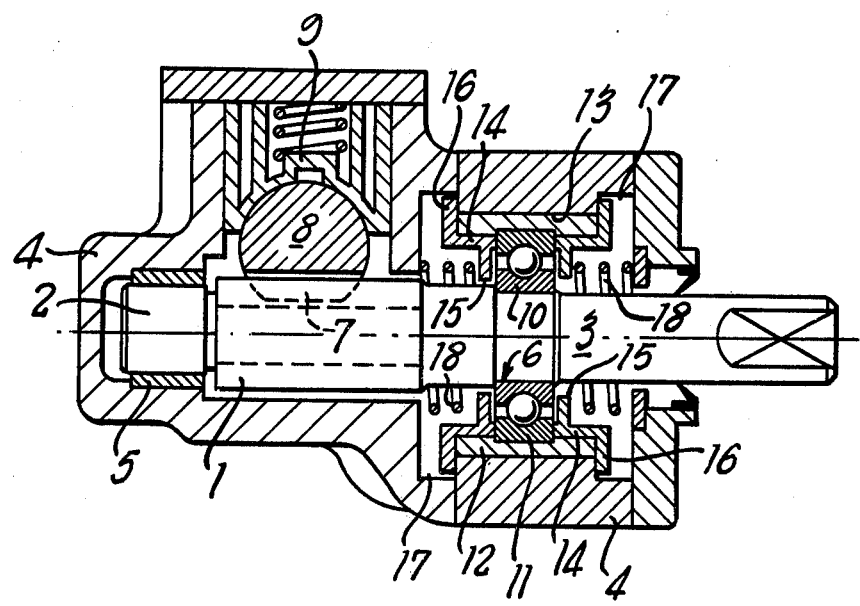

STEERING GEAR ASSEMBLIES

This invention relates to a steering gear assembly of the kind generally known as "rack and pinion".

According to the present invention there is provided a steering gear assembly comprising a rotatably mounted pinion in meshed engagement with the rack of a rack bar, longitudinal movement of the rack bar in response to rotation of the pinion being intended to provide a steering output, the pinion being displaceable relative to the rack bar along its axis of rotation and in either sense of axial direction from a neutral position and wherein resilient means is provided which biases the pinion to its neutral position in response to its said displacement therefrom.

In a steering gear assembly of the rack and pinion type the teeth of the pinion or of the rack are offset relative to the axis of rotation of the pinion, usually this is achieved by the pinion teeth being of helical formation. As a consequence, when there is a resistance to longitudinal displacement of the rack bar in response to rotation of the pinion, an axial thrust is imparted to the pinion resulting from the input torque on the pinion teeth which engage with the rack. This axial thrust reaction on the pinion may be observed in particular during a parking manoeuvre for a vehicle to which the steering gear assembly is fitted where it is often necessary to apply a high input torque to the pinion in an attempt to steer the road wheels while the vehicle is stationary or slow moving. By the present invention and in response to the aforementioned axial thrust on it, the pinion can be displaced axially from its neutral position and against the resilient biasing while at the same time rotating to move the rack bar. Controlled axial displacement of the pinion while imparting longitudinal movement to the rack bar will cause an increase in the effective mechanical ratio which is provided between the pinion and rack bar to give a steering advantage when heavy or "parking" loads are encountered to resist longitudinal movement of the rack bar. The resilient means should be appropriately selected so that its biasing effect does not merely result in the pinion being axially displaced through its maximum permitted distance in one sense of direction since this would merely provide a lost motion effect in the steering gear. By appropriate selection of the biasing means however a torque which is considerably higher than is normally encountered for imparting movement to the rack bar may be necessary to axially displace the pinion to its maximum extent in one or other axial direction and as the input torque to rotate the pinion increases the axial movement of the pinion together with its rotational movement will cause an increase in the aforementioned effective mechanical advantage. When the input torque to the pinion is relaxed, the pinion will return to its neutral position under effect of its biasing and thereafter the input torque can be re-applied to provide a further sequence of increased mechanical advantage should it prove necessary.

Usually the pinion will have a shaft which is integrally formed therewith and which shaft may extend from a housing of the steering gear assembly for connection to a steering input component. Alternatively the pinion shaft may be drivingly connected through a gear system for rotation of the pinion by a further shaft, which further shaft is intended for connection to a steering input component; in this latter case the gear system will be arranged to maintain driving engagement between the further shaft and the pinion shaft during axial displacement of the latter from its neutral position. Preferably the pinion shaft will include radially extending flange means (which may comprise a rolling bearing for the pinion) against which the resilient biasing means reacts during axial displacement of the pinion.

A steering gear assembly constructed in accordance with the present invention will now be described, by way of example only, with reference to the accompanying illustrative drawing which shows a section through the assembly taken in the direction of the pinion axis.

The steering gear assembly illustrated has a pinion 1 co-axial and integrally formed with which is a stub shaft 2 and an input shaft 3. The pinion 1 is rotatably mounted in a housing 4 by a plain bearing bush 5 which receives the shaft 2 and a ball bearing 6 located on the shaft 3. The shaft 3 extends from the housing 4 for coupling to a steering input component.

The pinion 1 has helically formed teeth which mesh with the teeth of a rack 7 on a rack bar 8 so that, in response to rotation of the pinion 1, the rack bar 8 is movable longitudinally through the housing 4 in conventional manner. The rack bar 8 which provides a steering output is intended to be coupled to the steerable road wheels of a vehicle to which the assembly is fitted and is biased by a spring loaded yoke 9 reacting against the housing 4 to urge the teeth of its rack 7 into engagement with the pinion 1.

In addition to permitting rotation of the pinion, both bearings 2 and 6 permit the pinion 1 and its associated shafts 2 and 3 to be displaced as a unit in the direction of its axis of rotation relative to the rack bar 8 and within the housing 4. This latter effect is achieved, in the case of the stub shaft 2 by that shaft being a straight sliding fit within the cylindrical bush 5. In the case of the bearing 6, the inner race 10 of that bearing is fitted and secured to the input shaft 3 so that it is in the nature of a flange on that shaft while the outer race 11 is fitted within and secured to an annular sleeve 12 which is axially slidable over a complementary slideway in the form of a cylindrical surface 13 within which it is located in the housing 4. Consequently if the pinion 1 is displaced axially the bearing 6 and sleeve 12 will move axially in unison therewith. Freely mounted on the shaft 3 and located one on either side of the bearing 6 are a pair of collars 14 each of which has a radially extending inner flange 15 and a radially extending outer flange 16. Each flange 15 overlies the side of the bearing 6 which is adjacent thereto and each flange 16 overlies the end of the sleeve 12 which is adjacent thereto and extends into an annular recess 17 formed in the internal wall of the housing 4. The collars 14 are respectively spring loaded by two coil springs 18 which are located on the shaft 3. Each spring 18 reacts between its respective collar 14 and the wall of the housing 4 so that both collars are urged axially for abutment of their flanges 15 with the bearing 6 and thereby the pinion 1 is located axially relative to the housing and rack bar in a neutral position which is that illustrated.

During use of the assembly an axial thrust is imparted to the pinion 1 as a result of the input torque from the shaft 3 being transmitted through the helical pinion teeth to the rack bar 8. However, during a steering exercise in which there is a light resistance to movement of the rack bar 8, the axial thrust which is imparted to the pinion 1 will be insufficient to displace the pinion axially in one direction or the other against the biasing of the appropriate spring 18 and as a consequence the steering gear operates in conventional manner. If the resistance to movement of the rack bar 8 increases, for example during a parking manoeuvre, the axial thrust resulting from the increase in input torque which is necessary to rotate the pinion and the reaction of the pinion teeth with the rack teeth will eventually become greater than the biasing force effected by the spring 18 which tends to oppose that axial thrust and the pinion is therefore displaced axially in addition to its rotational movement. This axial movement of the pinion 1 in either sense of direction forces the bearing 6 against the flange 15 of the appropriate collar 14 so that this collar is displaced in sympathy with the shaft 3 to progressively compress the associated spring 18 against the housing 4. During compression of one or other of these springs 18 the reaction therefrom on the pinion 1 increases progressively as the pinion is displaced from its neutral position. The effective result of the pinion 1 being displaced from its neutral position against the spring loading and while it is rotating is to cause an increase in the effective mechanical advantage which is applied from the pinion to the rack bar to give a steering advantage.

When the input torque to the pinion is relaxes so that no movement is imparted to the rack bar 8, the pinion is displaced axially under the biasing effect of the previously compressed spring and returns to its neutral position from which a further steering sequence can be made including axial displacement of the pinion and compression of the appropriate spring 18 should it prove necessary to take advantage of the increased mechanical ratio which is available in the steering gear.

It will be apparent from the drawing that when the pinion is being displaced axially to compress and thereby energise one or other of the springs 18, the bearing 6 moves axially away from the collar 14 associated with the non-compressed spring. During such displacement the non-compressed spring is retained between the housing 4 and its associated collar 14 while the latter is urged by the spring to move its outer flange 16 into abutment with the shoulder formed by the recess 17 within which that flange is axially movable.

What we claim is:

1. A rack and pinion steering gear for steering dirigible wheels of a vehicle comprising an output member movable to effect said steering, a manually rotatable input shaft, and a variable ratio steering mechanism interposed between said input shaft and said output member and operable to cause an increase in the effective mechanical advantage applied from said input shaft to said output member upon the application of increasing torque to said input shaft, said variable ratio steering mechanism comprising a rack connected with said output member, a pinion disposed in meshing engagement with said rack, connected with said input shaft and rotatable to cause longitudinal movement of said rack, said pinion being slidable axially along its axis of rotation, teeth on said rack and pinion having surfaces which produce a force tending to move said pinion axially along its axis of rotation upon torque being applied to said pinion, and biasing means controlling axial displacement of said pinion while said pinion imparts longitudinal movement to said rack to thereby vary the effective mechanical ratio between said pinion and said rack, a flange fixedly connected with said input shaft and extending radially outward perpendicular to the axis of rotation thereof, and said biasing means including first and second coil springs coaxial with said shaft and disposed on axially opposite sides of said flange and supported by the flange.

2. A steering gear as set forth in claim 1 wherein said flange comprises bearing means for rotatably mounting said pinion.

3. A steering gear as set forth in claim 2 further including a housing disposed about said pinion, said housing including surface means defining a passage coaxial with said pinion and surrounding said bearing, a sleeve slidably received in said passage, a radially outer portion of said bearing being fixedly connected with said sleeve.

4. A steering gear as set forth in claim 3 wherein said radially outer portion of said bearing comprises the outer race of said bearing.

5. A steering gear as set forth in claim 4 further including a pair of collars disposed on opposite sides of said bearing, each one of said collars being urged into engagement with said bearing by one of said coil springs, and shoulder means in said housing for restraining axial movement in one direction of one of said collars and one of said coil springs upon axial displacement of said pinion in said one direction from a neutral position against the biasing of the other one of said springs.

* * * * *